United States Patent [19]
Crane et al.

[11] Patent Number: 5,418,679
[45] Date of Patent: May 23, 1995

[54] CIRCUIT FOR OVERRIDING THE CRIPPLE MODE SO THAT THE RELAY REMAINS LATCHED

[75] Inventors: Burke J. Crane, Lombard, Ill.; Garth S. Jones; Kevin L. Nelson, both of Virginia Beach, Va.

[73] Assignee: Molex Incorporated, Lisle, Ill.

[21] Appl. No.: 43,329

[22] Filed: Apr. 6, 1993

[51] Int. Cl.⁶ .............................................. H02N 7/00
[52] U.S. Cl. ..................................... 361/71; 361/115; 361/730
[58] Field of Search ................... 361/115, 42, 45, 394, 361/49, 71, 59, 62

[56] References Cited
U.S. PATENT DOCUMENTS

| | | | |
|---|---|---|---|
| 4,631,627 | 12/1986 | Morgan | 361/153 |
| 4,831,496 | 5/1989 | Brant et al. | 361/394 |
| 5,038,247 | 8/1991 | Kelley et al. | 361/154 |

*Primary Examiner*—Marc S. Hoff
*Assistant Examiner*—S. Jackson
*Attorney, Agent, or Firm*—Stephen Z. Weiss

[57] ABSTRACT

A plug presence sensor comprises an LED and a light sensor in the form of a photo-transistor which senses presence of a plug in a receptacle. The sensor is monitored by a microcontroller to control latching of a relay. The microcontroller de-energizes the relay, so that no power is present at the receptacle, when no plug is inserted. When the plug is inserted, then the microcontroller causes the relay to be energized to provide power to the receptacle. The microcontroller is preprogrammed to communicate with a remote master controller. In the event that a loss of communication occurs between the microcontroller and the master controller, the microcontroller automatically de-energizes the relay so that no power is present at the receptacle. A communication error output signal is connected to an override circuit including a capacitor which differentiates an edge of the communication error signal to inject a pulse onto the plug presence sensor signal which simulates removal and reinsertion of the plug. As such, the override circuit fools the microcontroller into thinking that a plug was removed and then inserted so that the relay remains energized to power the outlet receptacle.

11 Claims, 3 Drawing Sheets

CIRCUIT FOR OVERRIDING THE CRIPPLE MODE SO THAT THE RELAY REMAINS LATCHED

FIELD OF THE INVENTION

This invention relates to a control for an automatic power receptacle and, more particularly, to an override for a cripple mode.

BACKGROUND OF THE INVENTION

In providing electrical circuits to a facility, such as a home, one or more branch circuits are wired to distribute electrical power to load devices, such as outlet receptacles or light fixtures. Typically, the receptacle or fixture is hardwired directly to the branch circuit, with power to the device being turned on or off at the device itself. For example, a light fixture might include a pull cord for actuating a switch, while a small appliance might include a power switch.

With recent technological developments it is both possible and advantageous to provide automated control of load devices to provide, for example, remote or timed switching. One such system directs all communication functions into a system controller. This gives a home owner flexible communication and power control from anywhere in the home there is a control panel or switch, or even anywhere there is a telephone, such as the car or office. An intelligent outlet receptacle allows individual appliances to be separately and automatically controlled as necessary or desired. To do so, some means must be provided for controlling switching of power to an electrical outlet receptacle. A practical switching device must be inexpensive and reliable. A latching relay has been found to be readily adaptable to such an application. A latching relay is latched when connected to a positive polarity voltage source and unlatched when connected to a negative polarity voltage source.

One known intelligent outlet receptacle connects electrical power to the outlet receptacle only when in use. Particularly, the outlet receptacle is disconnected from the power source when no plug is present and is connected to the power source when a plug is present in the receptacle. A sensing device senses presence or absence of a plug in the receptacle. A control circuit connected to the sensor and the latching relay controls latching and unlatching of the relay in response to a signal developed by the plug presence sensor.

The automatic switched power receptacle of the known form discussed above includes a microcontroller which communicates with various remote devices, including a "master" controller. The master controller has supervisory authority over any and all control components connected thereto. In such a system, loss of communications between the switched power receptacle and the master controller results in unlatching of the relay to disconnect power from the receptacle. In order to reestablish power to the receptacle, a user must remove and then reinsert the plug in the receptacle.

The present invention is intended to solve one or more of the problems discussed above.

SUMMARY OF THE INVENTION

In accordance with the invention there is provided an automatic power receptacle including an override for a cripple mode.

Broadly, there is disclosed herein a control circuit for use in an automatically switched power receptacle for communicating with a remote master controller. The power receptacle includes an outlet receptacle adapted to receive a plug, a relay connected between the outlet receptacle and a source of power to selectively power the receptacle and a plug presence sensor in proximity to the receptacle for sensing and developing a signal representing presence or absence of a plug in the receptacle. The control circuit includes a switch circuit for controlling a relay. A logic control is operatively connected to the switch circuit and the plug presence sensor. The logic control includes communication means for detecting loss of communication with the remote master controller and developing a communication error output signal, and control means for controlling the switch circuit to energize the relay only in response to the signal from the plug presence sensor indicating insertion of a plug in the receptacle and to de-energize the relay in response to the signal from the plug presence sensor indicating removal of a plug from the receptacle or in response to the communication means detecting loss of communications. An override circuit is connected between the logic control, to receive the communication error signal, and the plug presence sensor and includes means for modifying the signal developed by the plug presence sensor to simulate removal and insertion of a plug.

It is a feature of the invention that the override circuit comprises a capacitor differentiating a change in state of the communication error signal to develop a pulse injected onto the signal from the plug presence sensor.

If is another feature of the invention that the pulse is summed with the signal from the plug presence sensor.

In accordance with another aspect of the invention there is disclosed an improvement in an automatically switched power receptacle including a logic controller communicating with a remote master controller. An outlet receptacle is adapted to receive a plug. A plug presence sensor in proximity to the receptacle senses presence or absence of a plug in the receptacle. A switch circuit is connected between the outlet receptacle and a source of power to selectively power the receptacle. The logic controller controls the switch circuit to power the receptacle in response to the plug presence sensor sensing insertion of a plug in the receptacle and to remove power from the receptacle in response to the plug presence sensor sensing removal of a plug from the receptacle in response to loss of communications with the remote master controller. The improvement comprises means associated with the logic controller developing a communication error signal in response to loss of communication with the remote master controller. An override circuit is connected between the logic control, to receive the communication error signal, and the plug presence sensor and includes means for modifying the signal developed by the plug presence sensor to simulate removal and insertion of a plug.

In accordance with a further aspect of the invention, there is disclosed an automatically switched power receptacle for communicating with a remote master controller including an outlet receptacle adapted to receive a plug. A relay is connected between the outlet receptacle and a source of power to selectively power the receptacle. A plug presence sensor in proximity to the receptacle senses presence of a plug in the receptacle. The plug presence sensor comprises a light source and a light sensor, the light source and light sensor being disposed on opposite sides of a path of movement of a plug being inserted in the receptacle and the light sensor developing a signal having a first or second state incident to sensed light being above or below a select level. A switch circuit controls the relay. A logic control is operatively connected to the switch circuit and the plug presence sensor and includes communication means for detecting loss of communications with the remote master controller and developing a communication error output signal and control means for controlling the switch circuit to energize the relay only in response to the signal from the plug presence sensor being in the second state and to de-energize the relay in response to the signal from the plug presence sensor being in the first state or in response to the communication means detecting loss of communications. An override circuit is connected between the logic control, to receive the communication error signal, and the plug presence sensor and includes means for modifying the state of the signal developed by the plug presence sensor to simulate removal and insertion of a plug.

It is a feature of the invention that the relay comprises a latching relay.

It is another feature of the invention that the light source comprises an LED and the light sensor comprises a photo-transistor.

Particularly, the plug presence sensor comprises an LED and a light sensor in the form of a photo-transistor which senses presence of a plug in a receptacle. The sensor is monitored by a microcontroller to control latching of a relay. The microcontroller de-energizes the relay, so that no power is present at the receptacle, when no plug is inserted. When the plug is inserted, then the microcontroller causes the relay to be energized to provide power to the receptacle. The microcontroller is preprogrammed to communicate with a remote master controller. In the event that a loss of communication occurs between the microcontroller and the master controller, the microcontroller automatically de-energizes the relay so that no power is present at the receptacle. A communication error output signal is connected to an override circuit including a capacitor which differentiates an edge of the communication error signal to inject a pulse onto the plug presence sensor signal which simulates removal and reinsertion of the plug. As such, the override circuit fools the microcontroller into thinking that a plug was removed and then inserted so that the relay remains energized to power the outlet receptacle.

Further features and advantages of the invention will be readily apparent from the specification and from the drawing.

DETAILED DESCRIPTION OF THE INVENTION

Figure 1:
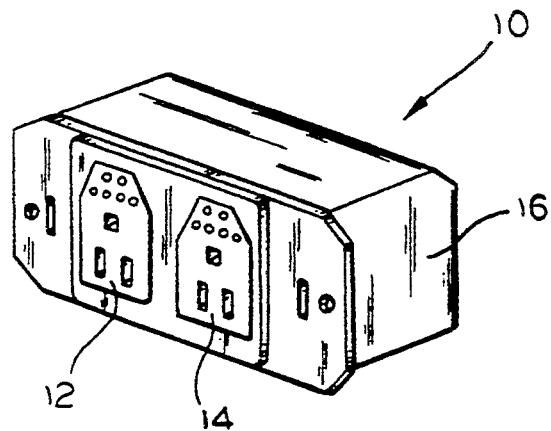
FIG. 1 is a perspective view of a switched power receptacle according to the invention.

FIG. 1 illustrates an automatically switched power receptacle 10 in accordance with the invention. The switched power receptacle 10 includes a first outlet receptacle 12 and a second outlet receptacle 14, each in a housing 16. Each outlet receptacle 12 and 14 is adapted to receive a conventional three-prong plug for selectively providing electrical power thereto. The illustrated power receptacles 12 and 14 includes additional receptacle structure for data communication which are not relevant to the claimed invention and therefore are not described in detail herein.

Figure 2:
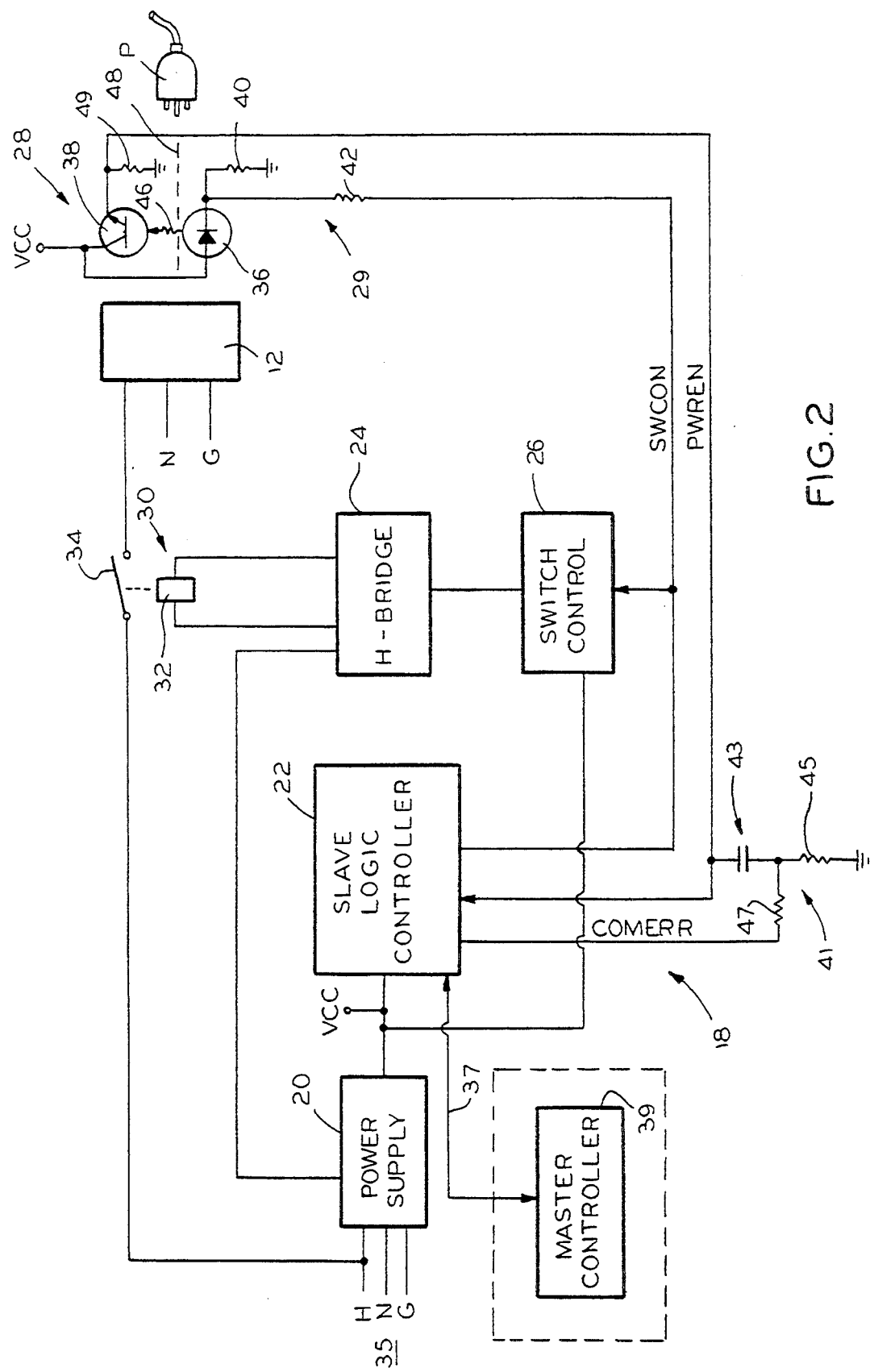
FIG. 2 is a block diagram illustrating a control circuit for the receptacle of FIG. 1.

FIG. 2 illustrates a control circuit 18 for the power receptacle 10 in block diagram form. The control circuit 18 includes a power supply circuit 20, a logic controller 22, an H-bridge switch circuit 24, a switch control circuit 26, a plug presence sensor 28 and a hysteresis circuit 29. The control circuit 18 is shown in association with the first outlet. However both such control circuits could use a common logic controller 22 and power supply 20.

A latching relay 30 controls the first outlet receptacle 12. The latching relay 30 has a relay coil 32 and an electrical contact 34 switched by the relay coil 32. The relay coil 32 is latched when connected to a positive polarity voltage source and unlatched when connected to a negative polarity voltage source. Such a latching relay 30 is permanently magnetized so that upon actuation by relatively high current of positive polarity, an included plunger is magnetically retained in an actuated position to close the contact 34. When the reverse polarity power is connected to the relay coil 32, then the magnetic field is reduced so that a spring force returns the plunger to an unlatched position opening the contact 34. The latching relay 30 may be of any conventional construction.

The power supply 20 is connected to a source of power 35 represented by input lines labeled "H" for hot, "N" for neutral and "G" for ground. The electrical contact 34 is connected between the hot terminal "H" and the hot terminal of the outlet receptacle 12 for selectively applying power to the same. The neutral and ground terminals are directly connected to the corresponding terminals of the outlet receptacle 12.

The power supply circuit 20 develops regulated DC power for operating the logic controller 22, the H-bridge circuit 24 and the switch control circuit 26. In the illustrated embodiment of the invention, the logic controller 22 is a slave logic controller which is preprogrammed to control the switch control circuit 26 in response to feedback received from the plug presence circuit 28. Further, the slave logic controller communicates via a data line 37 to a master controller 39. In the illustrated embodiment, the master controller 39 provides supervisory control over operations implemented by the slave logic controller 22. The particular nature of the control performed is not critical to the invention herein and is therefore not described in detail. In fact, the logic controller 22 may be a conventional microcontroller for developing logic signals as necessary for the particular application.

The logic controller 22 communicates with the switch control circuit 26, the plug presence sensor circuit 28, and the hysteresis circuit 29 via a switch control line labeled "SWCON" and a power enable feedback line labeled "PWREN".

The H-bridge switch circuit 24 comprises an H-bridge circuit of conventional construction which controls polarity of power applied to the relay coil 32. The relay coil 32 being of the remnant latching type, requires a well-defined pulse to operate. The pulsing of the H-bridge circuit 24 is controlled by the switch control circuit 26. Particularly, when the switch control line SWCON goes high, a first pulse is developed to control the H-bridge circuit to connect the relay coil 32 with positive polarity power. When the switch control line SWCON goes low, a second pulse is developed to control the H-bridge circuit 24 to provide negative polarity power to the relay coil 32. A current limit is included in the H-bridge circuit 24 to avoid over-magnetization during unlatching.

The plug presence sensor 28 comprises an LED 36 and a photo-transistor 38. The LED 36 is connected between a supply node, labeled VCC, and a resistor 40 to ground. The collector of the photo-transistor 38 is connected to supply, while its emitter is connected via a resistor 42 to ground. The junction between the resistor 42 and the emitter of the photo-transistor 38 is connected as feedback to the power enable line PWREN.

The hysteresis circuit 29 comprises an additional resistor 42 connected between the junction of the LED 36 and the resistor 40 to the switch control line SWCON.

In accordance with the invention, the LED 36 and the photo-transistor 38 are positioned in the housing 16 to be on opposite sides of a path of movement of one of the prongs of a plug P being inserted in the outlet receptacle 12. Particularly, the LED 36 acts as a light source directing light, as indicated by the arrow 46, to drive the photo-transistor 38. As the plug P is inserted in the outlet receptacle 12, as by moving it along a path of movement indicated by a dashed line 48, the prongs of the plug P break the beam of light to gradually decrease the amount of light sensed by the photo-transistor 38. Decreasing the amount of light turns the transistor 38 off. The status of the photo-transistor 38 is fed back to the logic controller 22 on the power enable line PWREN.

The slave logic controller is operable to assume a cripple mode when loss of communications occurs with the master controller 39. In the event that loss of communications occurs, then a signal on an error line labeled COMERR goes high. In accordance with the invention, the communication error signal line is connected to an override circuit 41. The override circuit 41 includes a capacitor 43 connected between the power enable line PWREN and a resistor 45 to ground. The communication error COMERR line is connected via a resistor 47 to the junction between the capacitor 43 and the resistor 45.

Figure 3:
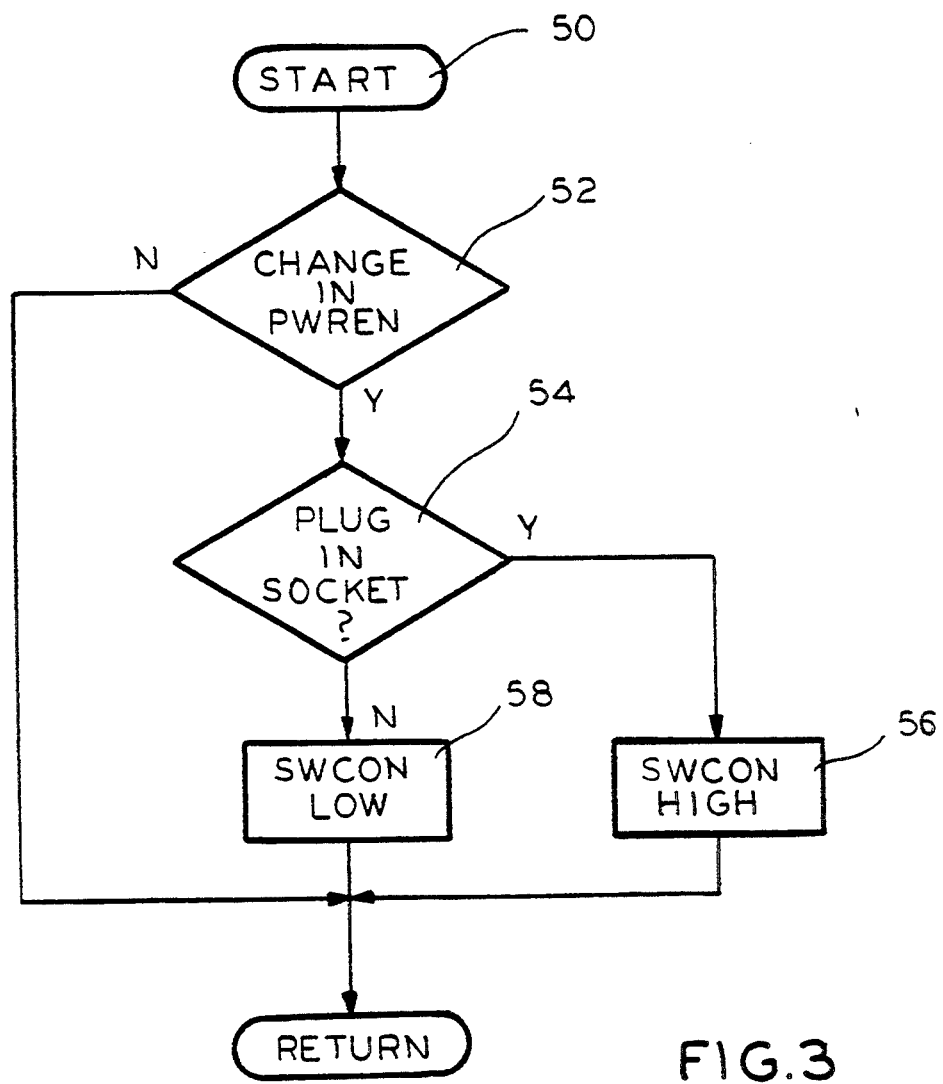
FIG. 3 is a flow diagram illustrating a program implemented in the logic controller of FIG. 2 for controlling the power receptacle.

With reference to FIG. 3, a flow diagram illustrates a program implemented in the logic controller 22 for controlling operation of the control circuit 18. The logic controller 22 may include a program for performing many different functions, such as providing remote control of the latching relay 30. The flow diagram illustrated in FIG. 3 is a portion of such program related specifically to the automatic control for the outlet receptacle 12 in response to presence or absence of a plug.

The control starts at a node 50 and then a decision block 52 determines if there is a change in the power enable line PWREN to the logic controller. If not, then the routine ends. A change occurs either when the plug P is inserted or is removed from the outlet receptacle 12 causing a change in state of the photo-transistor 38. Particularly, the photo-transistor 38 is normally in an "on" state with no plug P present, as a result of light emitted sensed from the LED 36. When a plug P is inserted, the light is cut off to switch the photo-transistor 38 to the "off" state. When such a change in state is sensed on the PWREN line, then a decision block 54 determines if the change represents a plug being in the socket, i.e., the power enable line going low. If so, then the switch control line SWCON is set high at a block 56 and the routine ends. If not, then the switch control line SWCON is set low at a block 58 and the routine ends.

When the switch control line SWCON goes high, the switch control circuit 26 controls the H-bridge circuit 24 to generate a positive polarity pulse to the relay coil 32 to close the contact 34 to power the outlet receptacle. Conversely, when the switch control SWCON goes low, the transition is sensed by the switch control circuit 26, causing the H-bridge circuit 24 to generate a negative polarity pulse to the relay coil 32 to open the contact 34 and disable the outlet receptacle 12.

The switch control line SWCON is also connected via the hysteresis circuit 29 to the LED 36. Particularly, when the switch control line SWCON transitions from a low state to a high state, it decreases current through the LED 36, causing it to dim. When the switch control line SWCON transitions from a high state to a low state, it increases current through the LED 36, causing it to brighten. This control of illumination from the LED 36 enhances the effect on the photo-transistor 38 resulting from insertion or removal of a plug P. This provides hysteresis to prevent cycling of the latching relay 30, which would otherwise result if the plug P was slowly inserted or removed, which could modulate the amount of light received by the photo-transistor 38.

Particularly, as a plug P is inserted, the amount of light sensed by the photo-transistor 38 gradually decreases. At the point at which the light has decreased sufficiently to indicate presence of the plug, i.e., the power enable line PWREN goes low, the latching relay 30 is latched. This is done by turning on the SWCON output, which dims the LED 36. The dimming of the LED further decreases light sensed by the photo-transistor 38 so if the plug P is slightly removed, the removal would not cause a reverse change of state of the photo-transistor 38. Similarly, when a plug is removed, additional light is sensed by the photo-transistor 38 until a point is reached at which the plug P is considered to have been sufficiently removed to cause the photo-transistor 38 to turn on. This sets the power enable line PWREN high, causing the switch control line SWCON to go low to brighten the output from the LED 36. Brightening of the LED 38 increases light sensed by the photo-transistor 38 so that if the plug P is not completely removed quickly enough, then the photo-transistor 38 will not turn off again.

Figure 4:
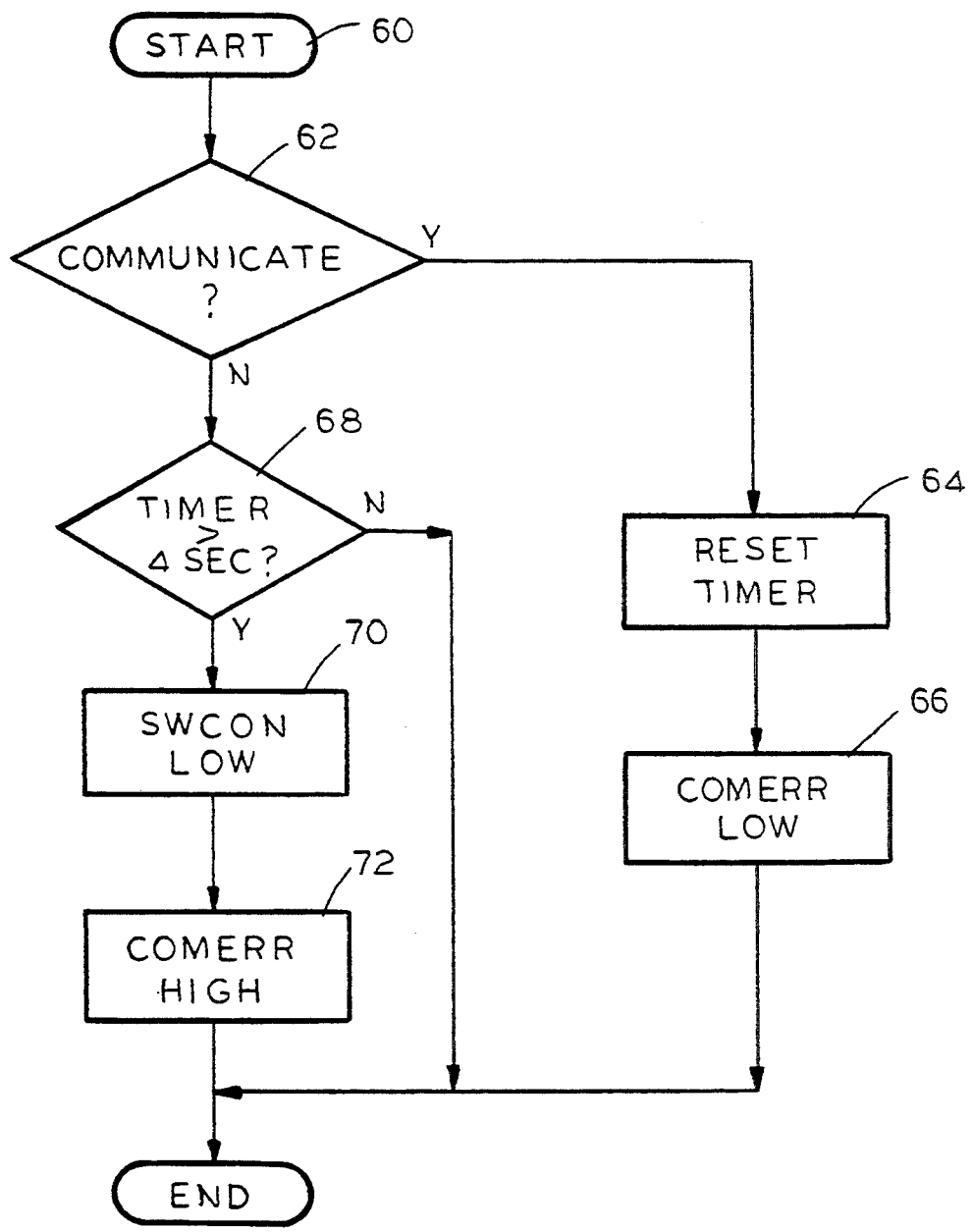
FIG. 4 is a flow diagram illustrating a timer operation for verifying communications with a remote master controller.

With reference to FIG. 4, a flow diagram illustrates a program implemented in the logic controller 22 for a timer operation verifying communications with the remote master controller 39. The control starts at a node 60 and then a decision block 62 determines if proper communications are established with the master controller 39. If so, then a communication timer is reset at a block 64 and the signal on the COMERR line is set low at a block 66 and the routine ends.

When communications are lost for more than four seconds, then the logic controller 22 is configured to shift to a cripple mode. Thus, when communications are lost, as determined at the decision block 62, then a decision block 68 determines if the communication timer value exceeds four seconds. If not, then the routine ends. If so, indicating that communications have been lost for more than four seconds, then control advances to a block 70 which sets the signal on the switch control line SWCON low. Doing so causes the switch control circuit 26 to control switching of the H-bridge circuit 24 to provide negative polarity power to the relay coil 32 to open the contact 34. As discussed above, in order to again energize the relay it is necessary that the plug P be inserted. However, in this instance the relay 30 was unlatched without removal of the plug P. Therefore, it is necessary to first remove the plug P and then insert it. In accordance with the invention, the removal and insertion is simulated using the override circuit 41. Particularly, at a block 72 the signal on the COMERR line is set to high. When this happens, the override circuit 41 is operated as by the capacitor 43 differentiating the edge of the COMERR signal to develop a pulse. The pulse is injected on the power enable line PWREN as by the two signals being summed. Thus, the override circuit 41 modifies the signal on the power enable line PWREN by briefly changing it from a low state to a high state and then back to a low state to trick the logic controller 22 into sensing that the plug P was removed and then inserted. As a result, the logic controller 22, implementing the flow diagram of FIG. 3, will again set the switch control line SWCON high at the block 56 to again latch the relay 30.

The above described unlatching and relatching of the relay 30 occurs so quickly that it would go unnoticed to a casual observer.

Thus, in accordance with the invention, an override circuit 41 is provided for overriding a cripple mode so that the relay 30 remains latched.

Thus, in accordance with the invention, an electrical hysteresis circuit is provided which prevents cycling of the latching relay 30 in an automatic power receptacle circuit.

We claim:

1. In an automatically switched power receptacle for communicating with a remote master controller, and including an outlet receptacle adapted to receive a plug, a relay connected between said outlet receptacle and a source of power to selectively power said receptacle, and a plug presence sensor in proximity to said receptacle for sensing and developing a signal representing presence or absence of a plug in said receptacle, a control circuit comprising:

a switch circuit for controlling said relay;
a logic control operatively connected to said switch circuit and said plug presence sensor, including communication means for detecting loss of communications with said remote master controller and developing a communication error output signal, and control means for controlling said switch circuit to energize said relay only in response to the signal from said plug presence sensor indicating insertion of a plug in said receptacle and to de-energize said relay in response to the signal from said plug presence sensor indicating removal of a plug from said receptacle or in response to said communication means detecting loss of communications; and
an override circuit connected between said logic control, to receive said communication error signal, and said plug presence sensor and including means for modifying the signal developed by said plug presence sensor to simulate removal and insertion of a plug.

2. The control circuit of claim 1 wherein said override circuit comprises a capacitor differentiating a change in state of said communication error signal to develop a pulse injected onto the signal from said plug presence sensor.

3. The control circuit of claim 2 wherein said pulse is summed with the signal from said plug presence sensor.

4. In an automatically switched power receptacle including a logic controller communicating with a remote master controller, an outlet receptacle adapted to receive a plug, a plug presence sensor in proximity to said receptacle for sensing presence or absence of a plug in said receptacle, and a switch circuit connected between said outlet receptacle and a source of power to selectively power said receptacle, said logic controller controlling said switch circuit to power said receptacle in response to the plug presence sensor sensing insertion of a plug in said receptacle and to remove power from said receptacle in response to the plug presence sensor sensing removal of a plug from said receptacle or in response to loss of communications with said remote master controller, the improvement comprising:

means associated with said logic controller developing a communication error signal in response to loss of communication with said remote master controller; and
an override circuit connected between said logic control, to receive said communication error signal, and said plug presence sensor and including means for modifying the signal developed by said plug presence sensor to simulate removal and insertion of a plug.

5. The improvement of claim 4 wherein said override circuit comprises a capacitor differentiating a change in state of said communication error signal to develop a pulse injected onto the signal from said plug presence sensor.

6. The improvement of claim 5 wherein said pulse is summed with the signal from said plug presence sensor.

7. An automatically switched power receptacle for communicating with a remote master controller comprising:

an outlet receptacle adapted to receive a plug;
a relay connected between said outlet receptacle and a source of power to selectively power said receptacle;
a plug presence sensor in proximity to said receptacle for sensing presence of a plug in said receptacle, said plug presence sensor comprising a light source and a light sensor, said light source and light sensor being disposed on opposite sides of a path of movement of a plug being inserted in said receptacle and said light sensor developing a signal having a first or second state incident to sensed light being above or below a select level;
a switch circuit for controlling said relay;
a logic control operatively connected to said switch circuit and said plug presence sensor, including communication means for detecting loss of communications with said remote master controller and developing a communication error output signal, and control means for controlling said switch circuit to energize said relay only in response to the signal from said plug presence sensor being at said second state and to de-energize said relay in response to the signal from said plug presence sensor being in said first state or in response to said communication means detecting loss of communications; and an override circuit connected between said logic control, to receive said communication error signal, and said plug presence sensor and including means for modifying the state of the signal developed by said plug presence sensor to simulate removal and insertion of a plug.

8. The automatically switched power receptacle of claim 7 wherein said relay comprises a latching relay.

9. The automatically switched power receptacle of claim 7 wherein said light source comprises an LED and said light sensor comprises a photo-transistor.

10. The automatically switched power receptacle of claim 7 wherein said override circuit comprises a capacitor differentiating a change in state of said communication error signal to develop a pulse injected onto the signal from said plug presence sensor.

11. The automatically switched power receptacle of claim 10 wherein said pulse is summed with the signal from said plug presence sensor.

* * * * *